United States Patent
Takami et al.

(10) Patent No.: US 6,762,397 B2
(45) Date of Patent: Jul. 13, 2004

(54) METHOD OF RECORDING AND READING INFORMATION USING MOLECULAR ROTATION

(75) Inventors: Tomohide Takami, Tokyo (JP); Kenichi Sugiura, Tokyo (JP)

(73) Assignee: Visionarts, Inc., Tokyo (JP)

( * ) Notice: Subject to any disclaimer, the term of this patent is extended or adjusted under 35 U.S.C. 154(b) by 146 days.

(21) Appl. No.: 10/218,727

(22) Filed: Aug. 14, 2002

(65) Prior Publication Data

US 2003/0218115 A1 Nov. 27, 2003

(30) Foreign Application Priority Data

May 21, 2002 (JP) ........................................ 2002-146545

(51) Int. Cl.[7] .............................................. G02B 7/04
(52) U.S. Cl. ............................ 250/201.3; 428/694 ML
(58) Field of Search ............................ 250/201.3, 221, 250/222.2, 201.5, 573, 576; 428/694 ML, 694 R, 624

(56) References Cited

U.S. PATENT DOCUMENTS 5,547,774 A * 8/1996 Gimzewski et al. . 428/694 ML

OTHER PUBLICATIONS

H. Noji et al. "Direct Observation of the Rotation of F1–ATPase". Nature, vol. 386 (1997) 299–302.
T.R. Kelly et al. "Unidirectional Rotary Motion in a Molecular System." *Nature*, vol. 401 (1999) 150–152.
J. K. Gimzewski et al. "Rotation of a Single Molecule Within a Supramolecular Bearing. " *Science* vol. 281 (1998) 531–533.
Kenji Oomori, Applied Physics, vol. 71, No. 2 (2002) 195 U.
Liebl et al., "Coherent Reaction Dynamics in a Bacterial Cytochrome COxidase." Nature, vol. 401 (1999) 181–184.
Q. Wang et al., "Vibrationally Coherent Photochemistry in the Femtosecond Primary Event of Vision." Science, vol. 266 (1994) 422–424.
S. J. Stranick and P. S. Weiss, J. "Alternating Current Scanning Tunneling Microscopy and Nonlinear Spectroscopy." Phys. Chem., vol. 98, (1994) 1762–1764.
Ryohei Yasuda, Hiroyuki Noji et al., "Resolution of Distinct Rotational Substeps by Submillisecond Kinetic Analysis of F1–ATPase." Nature vol. 401, Apr. 19, 2001, http://www.nature.com.
Scientific American: Exhibit: Molecular Motor Sept. 20, 1999, http://www.sciam.com/exhibit/1999/092099molecularmotor.

* cited by examiner

*Primary Examiner*—Que T. Le
(74) *Attorney, Agent, or Firm*—Brown & Michaels, PC

(57) ABSTRACT

The method of the present invention includes the steps of rotating a molecule having a predetermined structure by applying a first alternating current electromagnetic field to the molecule, wherein the first alternating current electromagnetic field is produced by an electromagnetic field generation means that is set to a predetermined phase, controlling a rotational phase of the molecule by applying a second electromagnetic field to the rotated molecule by an information recording means, detecting a signal using a signal detection means in accordance with a rotation of the molecule having the rotational phase which has been controlled, and outputting a shift between the phase of the first alternating current electromagnetic field and a phase of the detection signal from the signal detection means as information by an information reading means.

7 Claims, 3 Drawing Sheets

METHOD OF RECORDING AND READING INFORMATION USING MOLECULAR ROTATION

REFERENCE TO RELATED APPLICATIONS

This application claims an invention which was disclosed in Japanese application number 2002-146545, filed May 21, 2002, entitled "METHOD OF RECORDING AND READING INFORMATION USING MOLECULAR ROTATION". The benefit under 35 USC§119(a) of the Japanese application is hereby claimed, and the aforementioned application is hereby incorporated herein by reference.

BACKGROUND OF THE INVENTION

1. Field of the Invention

The present invention relates to a method of recording and reading information using the rotational phase of a molecule. More specifically, it relates to a method of implementing a memory that stores and reads information in a single molecule by using the tip of a scanning probe microscope to control the phase information for rotation within a molecule, and further using this tip to read the phase information.

2. Description of the Related Art

The scanning probe microscope (SPM) allows a single atomic molecule to be used for memory. However, in the methods that have been invented and proposed to date, position information is recorded by moving or removing atoms or molecules using the tip of a scanning probe microscope. In these methods, it is theoretically impossible to record numbers other than zeros and ones, that is to say, the digital information regarding the presence or absence of an atom or molecule. Furthermore, as the atoms or molecules were moved or removed each time that data was recorded or read, practical application thereof required a great deal of effort, and it was difficult to surpass the capacities of existing recording media.

Single molecule motors, such as the ATPase flagella motors existing in nature, are known. The rotation of these motors can be observed with an optical microscope. ATPase has also been used to make an artificial molecular motor. Furthermore, researchers have observed the rotation of molecules adsorbed on a metal surface by scanning probe microscope. However, the prior art has not used the rotational information of a molecular motor in a memory system.

Research using a femtosecond laser to control the phase information of molecules has been looked to as a form of quantum computing, and some attempts have been applied. However, the femtosecond lasers used in the prior art represent large-scale equipment. Quantum computing, as understood in the prior art, shows that, in accordance with decoherence theory, coherence will inevitably break down as system size increases, rendering impossible computations which require coherence to be maintained for long periods of time. This makes practical implementation extremely difficult.

SUMMARY OF THE INVENTION

The method of the present invention overcomes the disadvantages of the prior art. A particular object is to record phase information at the single molecule level. A further object is to record data in such a way as to exceed the density limits of digital recording, which are determined by the size of atomic molecules, and to exceed the recording densities assumed in the prior art.

More specifically, in the present invention, phase information is recorded at the single molecule level by controlling the phase information of the rotation within a single molecule with an electromagnetic field produced by the tip of a scanning probe microscope, and by using this tip as a probe so as to retrieve the rotational phase information of a single molecule. Consequently, it is possible to record data in such a way as to exceed the density limits of digital recording, which are determined by the size of atomic molecules, and to exceed the recording densities assumed in the prior art. In other words, as molecular rotation has a degree of freedom of 360°, large amounts of information can be stored in a single molecule, which is markedly different from digital recording elements comprising zeros or ones as known in the prior art.

In general, the phase information possessed by molecules takes the form of molecular vibration and molecular rotation. The vibration (expansion and contraction, etc.) of a molecule comprising only a few atoms has a period of the order of $10^{-13}$ to $10^{-14}$ seconds (oscillation frequency 10 to 100 THz). The rotational period is of the order of $10^{-11}$ to $10^{-12}$ seconds (rotation frequency 100 GHz to 1 THz). These periods are extremely short, and it is difficult to control these phases with existing techniques. The present invention solves this problem.

The present invention is a method of controlling rotational period and phase by means of resonance between the molecule and an external electromagnetic field. Using an alternating current scanning tunneling microscope, AC electromagnetic fields of 0 to 20 GHz can be applied to a molecule absorbed on a solid surface. Using this equipment, it is possible to lower the rotation frequency to a level at which it becomes technically possible to control. In a preferred embodiment, the aforementioned rotational resonance is ensured by attaching different functional groups, which have interactive potentials that each work attractively or repulsively with the external electromagnetic field, to terminals of the rotating element in the molecule. This method lowers the speed of rotation to a level at which it can be controlled and measured by existing techniques.

In order to read the phase information, a reference point is chosen for the rotational period of the molecule, and phase differences are read with respect to this reference point. The reference point is preferably the phase of the alternating current electromagnetic field that was first applied to the molecule so as to rotate it. Subsequently, an electromagnetic field is applied to the molecule, continuously or as a pulse, in order to shift the phase of the molecule. Thus, the phase difference is measured by observing the difference between the phase of the electromagnetic field which was first applied to the molecule and the phase of rotation of the molecule after the phase has been changed.

Herein, the term "phase difference" refers to the "rotational shift" of the molecule. If a molecule is not rotating, it does not have what is referred to herein as phase information (rotational phase information).

The parameter that is stored is the rotational phase difference of the molecule with respect to the phase of the electromagnetic field. Thus, in order to maintain this storage, it is necessary to maintain the rotation of the molecule. In order to achieve this, the storage device is scaled at the molecular scale to lower the friction and resistance of the molecule in rotation.

The method of the present invention includes the steps of rotating a molecule having a predetermined structure by applying a first alternating current electromagnetic field to the molecule, wherein the first alternating current electromagnetic field is produced by an electromagnetic field generation means that is set to a predetermined phase, controlling a rotational phase of the molecule by applying a second electromagnetic field to the rotated molecule by an information recording means, detecting a signal using a signal detection means in accordance with a rotation of the molecule having the rotational phase which has been controlled, and outputting a shift between the phase of the first alternating current electromagnetic field and a phase of the detection signal from the signal detection means as information by an information reading means.

In a preferred embodiment, the electromagnetic field generation means, the information recording means, and the signal detection means comprise a tip of a scanning tunneling microscope.

In another preferred embodiment, a plurality of functional groups are provided at a plurality of terminals of a rotating element of the molecule. The functional groups are attracted or repulsed by the external electromagnetic field.

In yet another preferred embodiment, the method further comprises the step of detecting a tunnel current in accordance with the rotation of the molecule, wherein the current signal detection means detects the tunnel current.

DETAILED DESCRIPTION OF THE INVENTION

Embodiments of the present invention are described with reference to FIGS. 1 through 4.

In the present invention, molecules are absorbed on an electrically conductive solid surface, and the rotation of a single molecule is controlled using a scanning tunneling microscope. This is preferably achieved by absorbing a molecule having a terminal functional group containing a sulfur atom (—SH, —SH$_3$, etc.) on a substrate produced by vacuum deposition of gold on a mica surface, or on a cleaned copper surface, etc.

When this molecule is absorbed on the surface, the sulfur atom (S) site interacts directly with the surface. The energy of absorption of the sulfur (S) to the surface is not strong enough to fix it to the surface, but is not so weak that it is desorbed from the surface. Accordingly, it is known that, by simply immersing the substrate intended for absorption in a solution (ethanol, etc.) of the molecules for a period of several hours, or by vacuum depositing the molecules on the surface, self-assembly is instigated wherein the absorbed molecules disperse over the surface, seeking a stable position. This system is well suited to the present invention, as neither clumping together of the molecules on the surface nor, conversely, desorption occurs.

Figure 1:
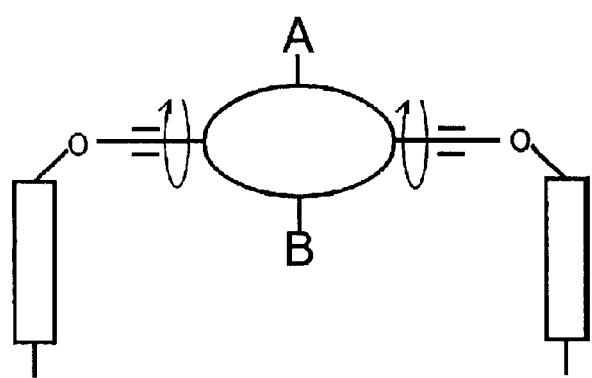
FIG. 1 shows a first schematic diagram of an organic molecule used in a single-molecule rotational phase memory.

In an example of a preferred embodiment, the organic molecule has the structure shown in FIG. 1. FIG. 1 shows an organic molecule used in a single-molecule rotational phase memory. A and B are functional groups that interact attractively/repulsively with an external electromagnetic field. Free rotation is made possible by providing triple-bond sites in two places on the carbon chain.

A and B are functional groups that interact in an attractive or repulsive manner, respectively, with a specific electromagnetic field, and as shown in the figure, the structure is such that they can rotate freely at an orientation perpendicular to the molecular axis. When a substrate produced by vacuum deposition of gold on mica is immersed for several hours in an ethanol solution in which 1 $\mu$M of this molecule and 1 mM of alkanethiol have been dissolved, or when the molecule shown in FIG. 1 and alkanethiol are vacuum deposited on a clean copper surface, a surface is produced on which the molecule and octanethiol are co-absorbed. A schematic diagram, illustrating a sample produced in this matter when viewed from the side, is shown in FIG. 2.

Figure 2:
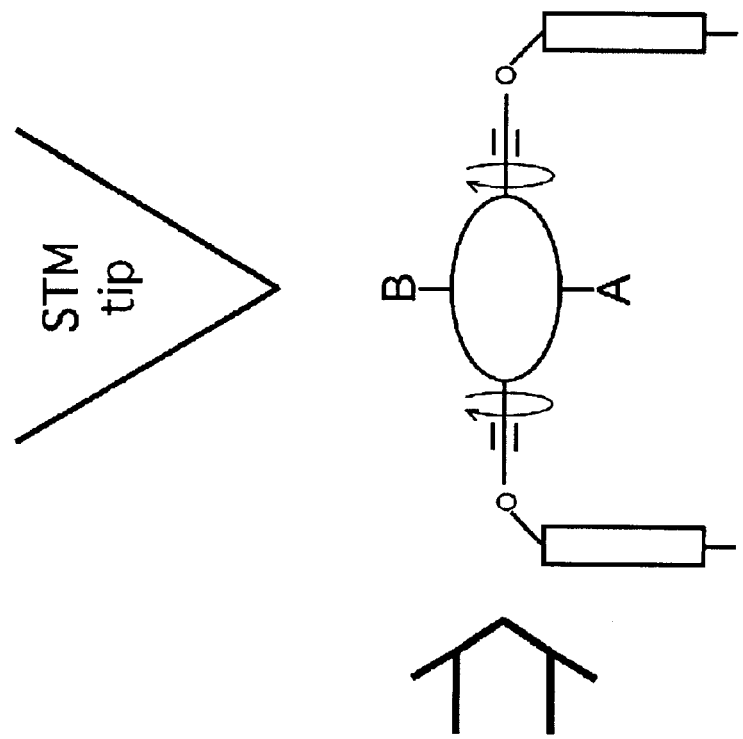
FIG. 2 shows a schematic diagram which illustrates the operating principles of a single-molecule rotational phase memory in an embodiment of the present invention.
Figure 2:
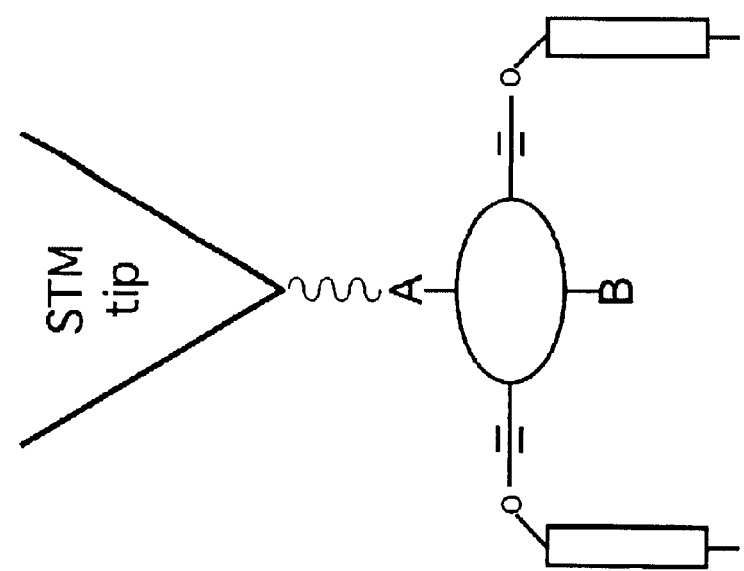

FIG. 2 illustrates the operating principles of a single-molecule rotational phase memory. By applying an electromagnetic field pulse to the molecule with the tip of a scanning tunneling microscope (STM), as shown in the left-hand panel of FIG. 2, the rotating portion of the molecule is inverted, as shown in the right-hand panel.

In other words, as shown in the left-hand panel of FIG. 2, the tip of a scanning tunneling microscope (STM) is brought near this molecule, and an electromagnetic field pulse is applied thereto. Thereupon, as shown in the right-hand panel of FIG. 2, the phase of the rotating portion of the molecule is reversed. This anti-phase of the molecule can be verified by measuring the tunnel current, which can be detected by the tip of a scanning tunneling microscope.

If, in the state shown in the right-hand panel of FIG. 2, an electromagnetic field pulse having the opposite polarity of that described above is applied with the tip, the state will revert to that shown in the left-hand panel of FIG. 2. By applying a series of pulses in this manner, a single molecule can be rotated, and the phase thereof can be controlled. Although the example given here only shows two wings, A and B, the number of wings can be increased, thereby increasing the number of recordable states.

Tunnel current is preferably detected with the tip of a scanning tunneling microscope (STM). The tunnel current is detected as a periodic variation in accordance with rotation of the molecule. The phase detected in this manner is taken as $\phi$. The phase of the alternating current electromagnetic field that was first applied so as to rotate the molecule is taken as $\phi_0$. By observing the difference between these two phases, which is calculated as $\Delta\phi=\phi-\phi_0$, it is possible to read the phase information that was written with the electromagnetic field pulse.

Figure 3:
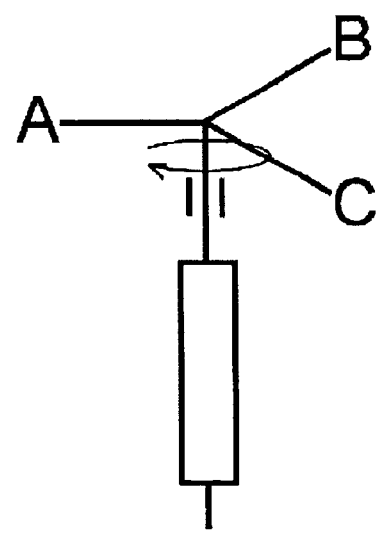
FIG. 3 shows a second schematic diagram of an organic molecule used in a single-molecule rotational phase memory.

In an alternative embodiment, the rotational axis is perpendicular to the sample surface. As an example of this embodiment, a molecule such as that shown in FIG. 3 is used. FIG. 3 shows an organic molecule used for a single-molecule rotational phase memory. A, B, and C are functional groups which each have specific interactivity with an external electromagnetic field. They are able to rotate freely as the result of a triple bond section at one place in the carbon chain.

A, B, and C are functional groups which each have a different specific interaction with a specific external electromagnetic field, and as shown in the figure, the structure is such that they can freely rotate at an orientation perpendicular to the molecular axis. When a substrate produced by vacuum deposition of gold on mica is immersed for several hours in an ethanol solution in which 1 µM of this molecule and 1 mM of alkanethiol have been dissolved, or when the molecule shown in FIG. 3 and alkanethiol are vacuum deposited on a clean copper surface, a surface is produced on which the molecule and octanethiol are co-absorbed. A schematic diagram illustrating a sample produced in this manner when viewed from the side is shown in FIG. 4.

Figure 4:
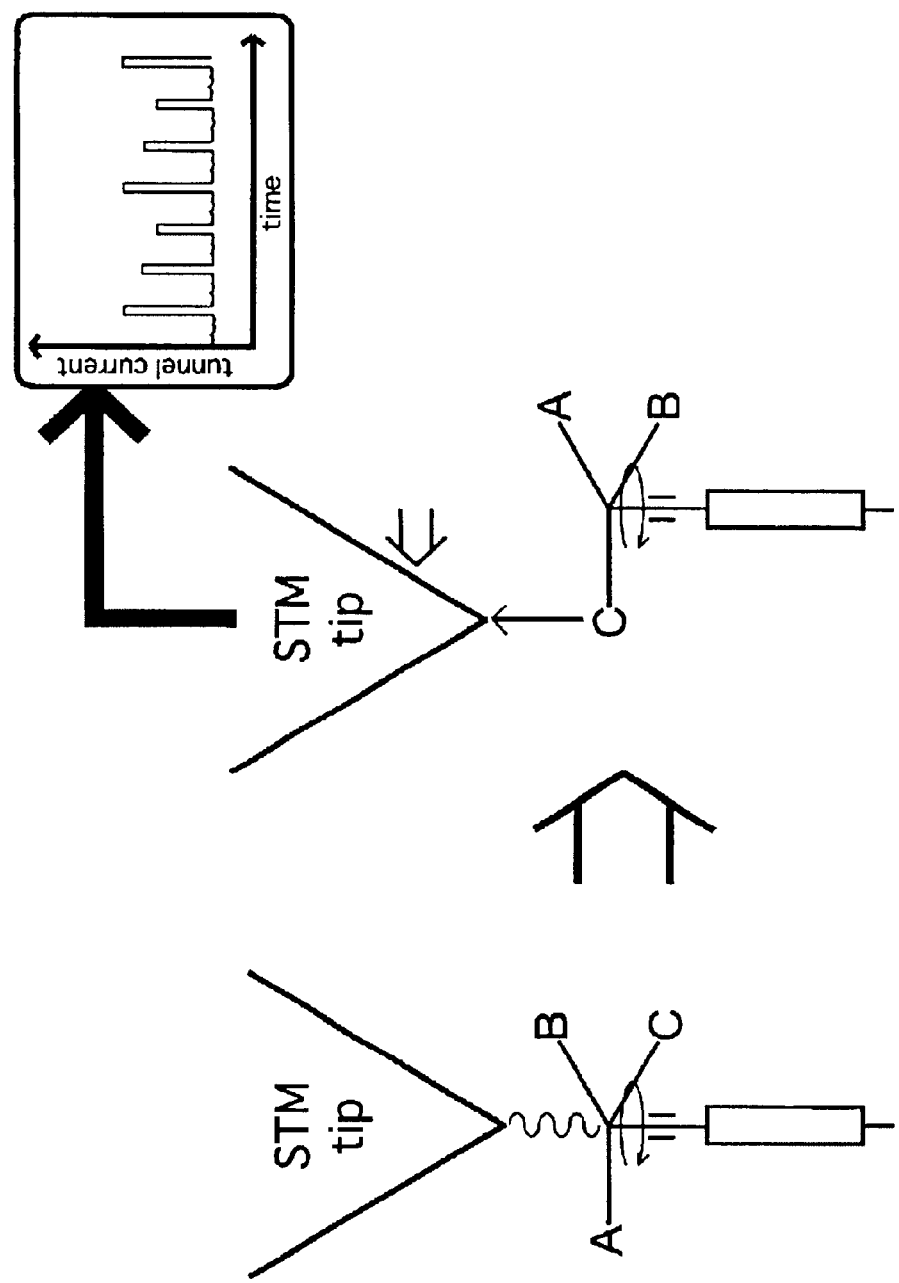
FIG. 4 shows a schematic diagram which illustrates the operating principles of a single-molecule rotational phase memory in an embodiment of the present invention.

FIG. 4 illustrates the operating principles of a single-molecule rotational phase memory. By applying an electromagnetic field pulse to the molecule with the tip of a scanning tunneling microscope (STM), as shown in the left-hand panel of FIG. 4, the rotating portion of the molecule is rotated, as shown in the right-hand panel. This rotation is measured by detecting the tunnel current with the tip of a scanning tunneling microscope (top of right-hand panel, in FIG. 4).

In other words, as shown in the left-hand panel of FIG. 4, the tip of a scanning tunneling microscope (STM) is brought near this molecule, and an alternating current electromagnetic field is applied. Thereupon, as shown in the right-hand panel of FIG. 4, the rotating portion of the molecule rotates in resonance with the frequency of the alternating current applied. As shown in the right-hand panel of FIG. 4, this rotation is verified by moving the tip of the scanning tunneling microscope from the center of the molecule and measuring the tunnel current. The rotational phase is controlled by controlling the phase of the alternating current applied. Thus, by applying an alternating current electromagnetic field, a single molecule is rotated, and the phase thereof controlled. According to quantum mechanics, almost all atomic-level states (quantum numbers) are discrete, but in the system shown in FIG. 4, the phase difference has a continuous state number. This allows analog numbers to be recorded at the molecular level.

The electromagnetic field which is initially applied in order to rotate the molecule serves as a trigger, and thereafter, pulses of electromagnetic field, etc., shift the phase of the molecule from the reference phase. Then, with the tip shifted to a specific position away from the center of the molecule, the rotation of the molecule is measured by means of the tunnel current, etc. The phase difference is detected by observing the time difference in the signal-strength period of this signal and the trigger signal.

The present invention is not limited to the embodiments described above. For example, in the examples described above, the tip of a scanning tunneling microscope is used as the electromagnetic field generation means, the information recording means, and the signal detection means. Alternatively, dedicated electromagnetic field generation means, information recording means, and signal detection means can be developed and implemented as part of the equipment of the storage device according to the present invention.

The present invention controls the phase information for rotation within a single molecule by means of an electromagnetic field produced by the tip of a scanning probe microscope, and uses this tip as a probe with which to retrieve the rotational phase information for a single molecule, whereby phase information can be recorded at the single-molecule level. By these means, an excellent method of recording and reading information is provided which makes it possible to exceed digital recording densities which are determined by the size of atomic molecules, and to record information at recording densities exceeding those assumed in the prior art.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of recording and reading information using molecular rotation comprising the steps of:

a) rotating a molecule having a predetermined structure by applying a first alternating current electromagnetic field to the molecule, wherein the first alternating current electromagnetic field is produced by an electromagnetic field generation means that is set to a predetermined phase;

b) controlling a rotational phase of the molecule by applying a second electromagnetic field to the rotated molecule by an information recording means;

c) detecting a signal using a signal detection means in accordance with a rotation of the molecule having the rotational phase which has been controlled; and d) outputting a shift between the phase of the first alternating current electromagnetic field and a phase of the detection signal from the signal detection means as information by an information reading means.

2. The method of claim 1, wherein the electromagnetic field generation means comprises a tip of a scanning tunneling microscope.

3. The method of claim 1, wherein the information recording means comprises a tip of a scanning tunneling microscope.

4. The method of claim 1, wherein the signal detection means comprises a tip of a scanning tunneling microscope.

5. The method of claim 1, wherein the electromagnetic field generation means, the information recording means, and the signal detection means comprise a tip of a scanning tunneling microscope.

6. The method of claim 1, wherein a plurality of functional groups are provided at a plurality of terminals of a rotating element of the molecule, wherein the functional groups are attracted or repulsed by the external electromagnetic field.

7. The method of claim 1, further comprising the step of detecting a tunnel current in accordance with the rotation of the molecule, wherein the current signal detection means detects the tunnel current.

* * * * *